T. HYATT.
Illuminating Tile.
No. 6,630. Reissued Sept. 7, 1875.
Fig. 1.
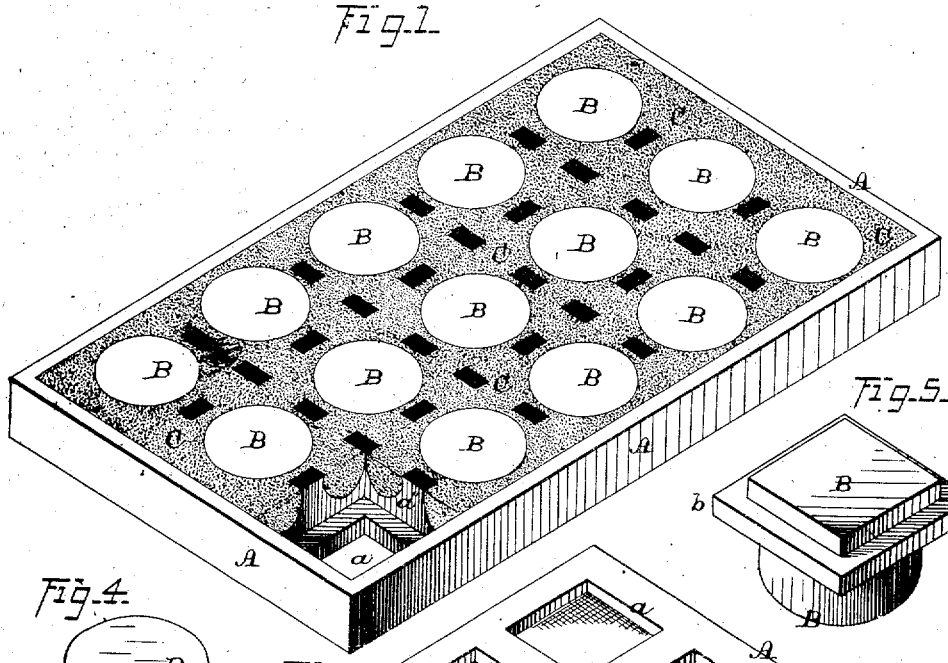
Fig. 5.
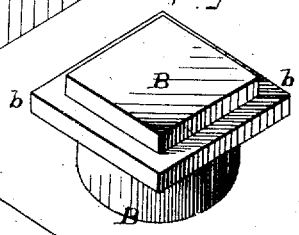
Fig. 4.
Fig. 2.
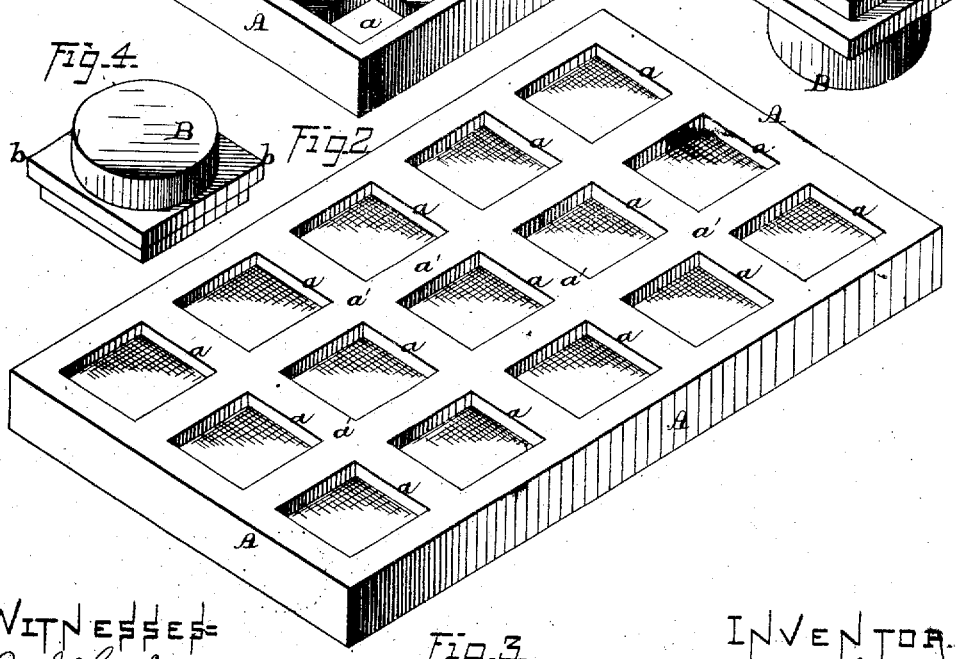
Fig. 3.
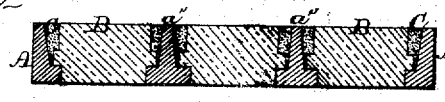
WITNESSES:
Jas. E. Hutchinson
John R. Young
INVENTOR.
Theodore Hyatt, by
Prindle and Hayden his Attys

BEST AVAILABLE COPY

UNITED STATES PATENT OFFICE.

THEODORE HYATT, OF NEW YORK, N. Y.

IMPROVEMENT IN ILLUMINATING-TILES.

Specification forming part of Letters Patent No. 165,835, dated July 20, 1875; reissue No. 6,630, dated September 7, 1875; application filed August 23, 1875.

*To all whom it may concern:*

Be it known that I, THEODORE HYATT, of New York, county and State of New York, did invent certain new and useful Improvements in Illuminating-Tiles, for which Letters Patent No. 165,835 were issued to me upon the 20th day of July, 1875, which Letters Patent have been found defective, in that the specification and claims do not cover and embrace all of the original invention as set forth in the application filed in the Patent Office on the 3d day of July, 1875.

Now, therefore, being desirous of reissuing said Letters Patent, herewith surrendered, I have prepared and do hereby declare that the following is a full, clear, and exact description of the said invention, reference being had to the accompanying drawings, making a part of this specification, in which—

Figure 1 is a perspective view of the upper side of my improved tile. Fig. 2 is a like view of the lower side of the same. Fig. 3 is a cross-section of said tile, and Figs. 4 and 5 are perspective views of one of the lenses detached from its frame.

Letters of like name and kind refer to like parts in each of the figures.

The design of my invention is to improve the quality of an illuminating-tile for use as a walking-surface; and it consists principally in an illuminating-tile provided with cross-bars that have the forms of inverted arches, and in which the abutments of said arches are flush with the upper surface of said tile, substantially as and for the purpose hereinafter specified. It consists, further, in an illuminating-tile provided with cross-bars, each of which has a portion of its upper surface flush with the upper surface of said tile, while another portion is removed to permit the plastic filling to pass from one lens-opening to another, and form an interlocked mass of the same, substantially as and for the purpose hereinafter shown. It consists, finally, in an illuminating-tile having a portion of its upper surface composed of emery combined with adhesive material, substantially as and for the purpose hereinafter set forth.

In the annexed drawings, A represents a rectangular tile, which has its otherwise open center divided into a series of square light openings, *a*, by means of intersecting cross-bars *a'*, that have a ⊥ shape in cross-section. The horizontal portions of the cross-bars *a'* and *a'* form ledges, for and upon which the lenses B and B are supported, each of which lenses is cylindrical from its upper end downward nearly to its lower end, at which latter point is provided a horizontally and outwardly projecting flange, *b*, that corresponds to and loosely fills the light opening *a*. If desired, said lens may be extended downward between said cross-bars *a'* and *a'* to the bottom of the tile, in which event such extended portion would be reduced in horizontal dimensions, as seen in Fig. 5. The vertical portion, or web, of each cross-bar forms a series of inverted arches, the abutments *a''* of which extend upward to and are flush with the upper surface of the tile.

The metallic portion of the tile being thus constructed, the lenses are placed in position, and the spaces between the upper portions of the same and the cross-bars are filled with a composition formed of emery and suitable adhesive material, which composition is applied in a plastic state and allowed to harden before the tile is used.

It is intended that the upper surfaces of the lenses, the side and cross bars, and the filling composition, shall have the same plane, so that the feet of a person standing upon the tile shall be supported equally by each material named, in which event all liability to slipping is avoided and a firm foothold afforded by the gritty surface of the filling.

The principal object sought by the cutting away of portions of the cross-bars between the lens-openings is to enable the plastic filling within each opening to be combined with and form part of such filling within the other openings, and thereby form upon the upper surface of the tile a continuous surface of non-slipping material, while at the same time the abutments *a''* offer sufficient resistance to wear to prevent either the glass or the filling-composition from becoming abraded with undue rapidity, said composition furnishing a firm foothold that could not be obtained by the use of metal or glass, and the union of said materials enabling an illuminating-tile to be constructed that is as easy to the foot and as safe from slipping as is an ordinary wooden floor.

The inverted-arch form of the cross-bars gives to them unusual strength, and enables the tile to be constructed with less weight of metal than would otherwise be necessary, while, from the peculiar form of the lens, no liability exists to their displacement, and an increase is effected in their light-transmitting qualities.

As a walking-surface the emery composition possesses important advantages, as it not only furnishes a firm, sure foothold, but is so hard as to have great durability without being liable to become glazed by use.

Having thus fully set forth the nature and merits of my invention, what I claim as new is—

1. An illuminating-tile, A, provided with cross-bars $a'$ and $a'$, that have the form of inverted arches, the abutments $a''$ of which arches are flush with the upper surface of said tile, substantially as and for the purpose specified.

2. An illuminating-tile provided with cross-bars, each of which has a portion of its upper surface flush with the upper surface of said tile, while another portion is removed to permit the plastic filling to pass from one lens-opening to another, and form an interlocked mass of the same, substantially as and for the purpose shown.

3. An illuminating-tile, having a portion of its upper surface composed of emery combined with adhesive material, substantially as and for the purpose set forth.

In testimony whereof, I have hereunto set my hand, this 18th day of August, 1875.

THEODORE HYATT.

Witnesses:
WILLIAM ACKERMANN,
E. P. STARR.